(12) United States Patent
Degura

(10) Patent No.: US 11,703,926 B2
(45) Date of Patent: Jul. 18, 2023

(54) ELECTRONIC DEVICE AND METHOD

(71) Applicant: CANON KABUSHIKI KAISHA, Tokyo (JP)

(72) Inventor: Yasusaburo Degura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/444,412

(22) Filed: Aug. 4, 2021

(65) Prior Publication Data

US 2022/0043495 A1    Feb. 10, 2022

(30) Foreign Application Priority Data

Aug. 7, 2020  (JP) ................................. 2020-134685

(51) Int. Cl.
| | |
|---|---|
| *G06F 1/00* | (2006.01) |
| *G06F 1/26* | (2006.01) |
| *G06F 21/44* | (2013.01) |
| *G06F 1/20* | (2006.01) |

(52) U.S. Cl.
CPC ................ *G06F 1/26* (2013.01); *G06F 1/206* (2013.01); *G06F 21/44* (2013.01)

(58) Field of Classification Search
CPC . G06F 1/26; G06F 1/206; G06F 21/44; G06F 1/263; H04N 5/23241; H02H 5/04; H02H 7/228; H02H 7/26
See application file for complete search history.

(56) References Cited

U.S. PATENT DOCUMENTS

| | | | |
|---|---|---|---|
| 2014/0184897 A1 | 7/2014 | Degura et al. | |
| 2015/0180221 A1* | 6/2015 | Leinonen | H01R 13/7137 361/103 |
| 2016/0164330 A1 | 6/2016 | Imazu et al. | |

(Continued)

FOREIGN PATENT DOCUMENTS

JP    2017-038429 A    2/2017

OTHER PUBLICATIONS

The European Search Report dated Apr. 21, 2022, that issued in the corresponding European Patent Application No. 21189777.2

(Continued)

*Primary Examiner* — Zhipeng Wang
(74) *Attorney, Agent, or Firm* — Cowan, Liebowitz & Latman, P.C.

(57) ABSTRACT

An electronic device includes a detecting unit, a communicating unit, and a control unit. The detecting unit detects a temperature of a cable connected to the electronic device. The communicating unit receives cable information including information related to the cable from the cable. The control unit changes a threshold temperature from a predetermined temperature to a temperature indicated by the cable information, in a case where the temperature indicated by the cable information is higher than the predetermined temperature and the communicating unit has received the cable information. The control unit controls a power supply device to stop supplying power from the power supply device to the electronic device via the cable or controls the electronic device to stop receiving power from the power supply device via the cable, in a case where a detected temperature of the cable is higher than the threshold temperature.

20 Claims, 7 Drawing Sheets

(56) References Cited

U.S. PATENT DOCUMENTS

| | | | |
|---|---|---|---|
| 2016/0322803 A1* | 11/2016 | Zaidi | H02H 3/025 |
| 2017/0038810 A1 | 2/2017 | Ueki | |
| 2017/0085100 A1* | 3/2017 | Zhang | G01K 13/00 |
| 2017/0103197 A1 | 4/2017 | Degura | |
| 2017/0179744 A1* | 6/2017 | Zhang | G01R 19/16595 |
| 2017/0207647 A1* | 7/2017 | Zhang | H02H 7/18 |
| 2018/0004277 A1 | 1/2018 | Matsui et al. | |
| 2018/0004279 A1 | 1/2018 | Matsui et al. | |
| 2018/0024899 A1 | 1/2018 | Degura et al. | |
| 2018/0081326 A1 | 3/2018 | Degura | |
| 2018/0128694 A1* | 5/2018 | Wee | G01K 15/00 |
| 2019/0319465 A1* | 10/2019 | Si | H02J 7/0042 |
| 2019/0391628 A1 | 12/2019 | Camiolo et al. | |
| 2021/0029282 A1 | 1/2021 | Degura | |

OTHER PUBLICATIONS

IEC 62680-1-3 ED4, "Universal serial bus interfaces for data and power—Part 1-3: Common components—USB Type-C Cable and Connector Specification", International Electrotechnical Commision, pp. 1-367 (Jul. 3, 2020).

\* cited by examiner

ELECTRONIC DEVICE AND METHOD

BACKGROUND

Field of the Disclosure

Aspects of the disclosure generally relate to an electronic device capable of supplying or receiving power via a cable, and to a method of controlling the electronic device.

Description of the Related Art

Japanese Patent Laid-Open No. 2017-38429 describes a power supply system compliant with USB (Universal Serial Bus) PD (Power Delivery) standard.

An E-marked cable (Electronically Marked Cable) compliant with the USB PD standard and with USB Type-C standard has an ID chip storing therein cable information (such as a current capacity, performance, and vendor information), i.e., information related to the cable. In a case where a cable connected to an electronic device is not the E-marked cable, the cable may be a poor-quality cable.

Another problem is that there is a possibility that information in the ID chip of the E-marked cable is copied in an ID chip included in a poor-quality cable. In such a case, the electronic device connected to the poor-quality cable pretending to be the E-marked cable may misidentify the poor-quality cable as the E-marked cable.

When power is supplied from the electronic device to another electronic device via the poor-quality cable, a temperature of an insulator or a sheath (outer cover) of the cable may rise to a level of at least a permissible temperature of the cable. In this case, heat may damage the cable or the electronic device to possibly deteriorate safety of the cable or the electronic device.

SUMMARY

According to various embodiments, there is provided an electronic device capable of safely supplying or receiving power via the cable.

According to various embodiments, there is provided an electronic device comprising: a detecting unit that detects a temperature of a cable connected to the electronic device; a communicating unit that receives cable information including information related to the cable from the cable; and a control unit that (a) changes a threshold temperature from a predetermined temperature to a temperature indicated by the cable information, in a case where the temperature indicated by the cable information is higher than the predetermined temperature and the communicating unit has received the cable information from the cable, and (b) controls a power supply device to stop supplying power from the power supply device to the electronic device via the cable or controls the electronic device to stop receiving power from the power supply device via the cable, in a case where a detected temperature of the cable is higher than the threshold temperature.

According to various embodiments, there is provided an electronic device comprising: a detecting unit that detects a temperature of a cable connected to the electronic device; a communicating unit that receives cable information including information related to the cable from the cable; and a control unit that (a) changes a threshold temperature from a predetermined temperature to a temperature indicated by the cable information, in a case where the temperature indicated by the cable information is higher than the predetermined temperature and the communicating unit has received the cable information from the cable, and (b) controls the electronic device to stop supplying power from the electronic device to a power receiving device via the cable or controls the power receiving device to stop receiving power from the electronic device via the cable, in a case where a detected temperature of the cable is higher than the threshold temperature.

According to various embodiments, there is provided a method comprising: detecting a temperature of a cable connected to an electronic device; changing a threshold temperature from a predetermined temperature to a temperature indicated by cable information including information related to the cable, in a case where the temperature indicated by the cable information is higher than the predetermined temperature and a communicating units of the electronic device has received the cable information from the cable; and controlling a power supply device to stop supplying power from the power supply device to the electronic device via the cable or controlling the electronic device to stop receiving power from the power supply device via the cable, in a case where a detected temperature of the cable is higher than the threshold temperature.

According to various embodiments, there is provided a method comprising: detecting a temperature of a cable connected to an electronic device; changing a threshold temperature from a predetermined temperature to a temperature indicated by cable information including information related to the cable, in a case where the temperature indicated by the cable information is higher than the predetermined temperature and a communicating units of the electronic device has received the cable information from the cable; and controlling the electronic device to stop supplying power from the electronic device to a power receiving device via the cable or controlling the power receiving device to stop receiving power from the electronic device via the cable, in a case where a detected temperature of the cable is higher than the threshold temperature.

Further aspects of the disclosure will become apparent from the following description of exemplary embodiments.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

Figure 1:
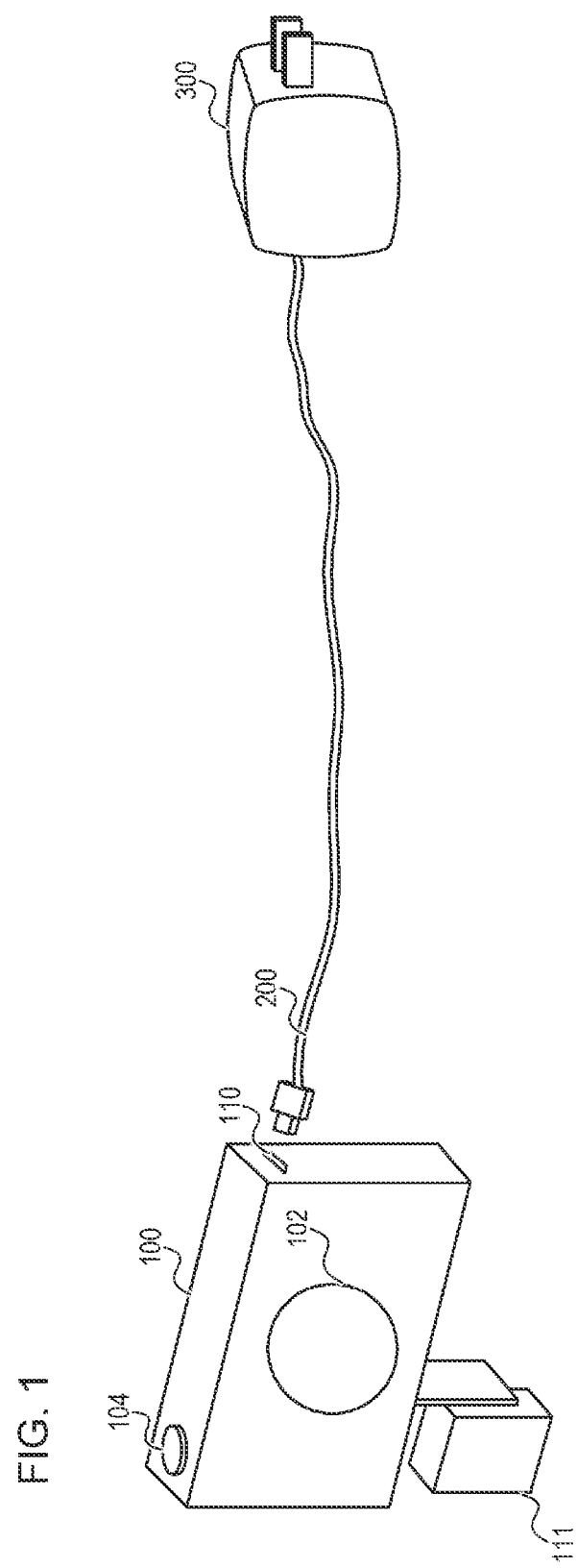
FIG. 1 is a diagram for illustrating components of a power supply system in a first embodiment.

FIG. 1 is a diagram for illustrating components of a power supply system in a first embodiment. The power supply system in the first embodiment includes an electronic device 100, a cable 200, and a power supply device 300. Each of the electronic device 100, the cable 200, and the power supply device 300 is compliant with the USB PD (Power Delivery) standard and the USB Type-C standard. Note that the cable 200 is any of an E-marked cable, a cable pretending to be the E-marked cable, and a cable other than the E-marked cable.

The electronic device 100 is a power receiving device to which power is supplied from the power supply device 300. In the first embodiment, the electronic device 100 is capable of acting as an image capture apparatus (e.g., a digital camera). However, the electronic device 100 may also be capable of acting as a media player, a smartphone, or a personal computer.

The electronic device 100 includes an imaging unit 102, an operation unit 104, and a connection unit 110. The electronic device 100 is operable with power supplied from a battery 111. The connection unit 110 in the electronic device 100 is connected to the power supply device 300 via the cable 200 to obtain the power. The connection unit 110 is a USB Type-C connector. The electronic device 100 is also operable with power supplied from the power supply device 300, not with the power from the battery 111.

The power supply device 300 is an electronic device that supplies the power to the electronic device 100. The power supply device 300 is an AC adapter or a mobile battery. In the first embodiment, the power supply device 300 is a Source device, while the electronic device 100 is a Sink device.

Figure 2:
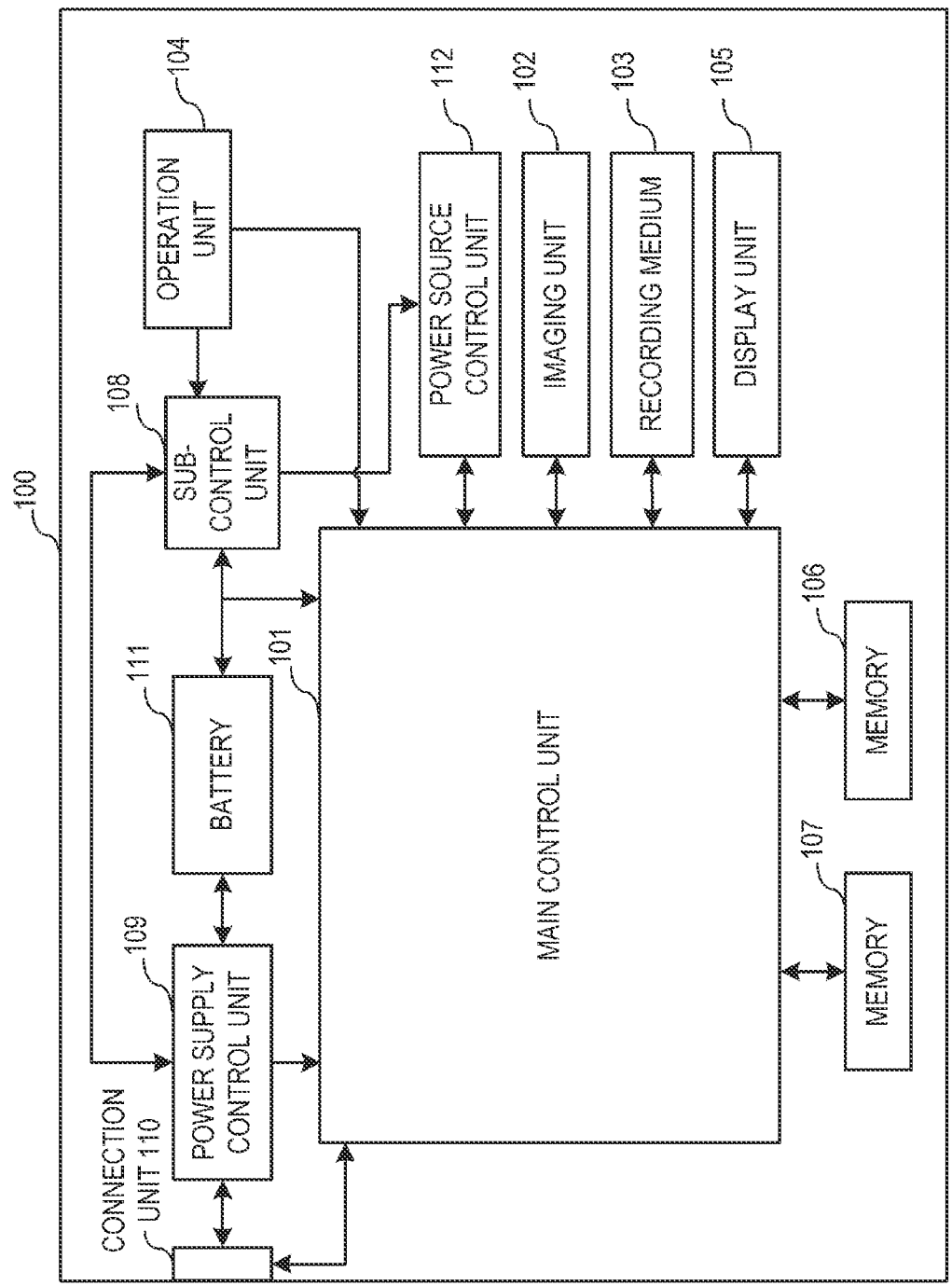
FIG. 2 is a block diagram for illustrating components of an electronic device 100 in the first embodiment.

Next, referring to FIG. 2, components of the electronic device 100 will be described. The electronic device 100 includes a main control unit 101, the imaging unit 102, a recording medium 103, the operation unit 104, a display unit 105, a memory 106, a memory 107, a sub-control unit 108, a power control unit 109, the connection unit 110, the battery 111, and a power source control unit 112.

The main control unit 101 executes a program stored in the memory 107 to be able to control each of the components of the electronic device 100.

The imaging unit 102 includes a lens unit and an imaging element and generates image data from an optical image of a subject. The image data generated by the imaging unit 102 is subjected to a predetermined image processes performed by the main control unit 101, and then recorded on the recording medium 103.

The recording medium 103 records the image data output from the imaging unit 102. The recording medium 103 may be embedded in the electronic device 100 or may also be detachable from the electronic device 100.

The operation unit 104 receives an instruction given by a user to the electronic device 100. The operation unit 104 delivers, to the main control unit 101 or to the sub-control unit 108, a signal responding to the instruction from the user. The operation unit 104 includes a power source button (an operation member for the user to give an instruction to turn ON or OFF a power source of the electronic device 100), a release switch (an operation member for the user to give an instruction to image), and a zoom lever (an operation member for the user to give an instruction to zoom the image. The operation unit 104 includes a reproduction button (an operation member for the user to give an instruction to reproduce the image data), a mode dial (an operation member for the user to give an instruction to switch the electronic device 100 to an activation mode), and a touch panel provided in the display unit 105.

Note that the release switch includes a first switch (SW1) and a second switch (SW2). When the release switch shifts to a so-called half-pressed state, the first switch (SW1) shifts to an ON state. When the first switch (SW1) has shifted to the ON state, the main control unit 101 receives an instruction to make preparations for imaging. The imaging preparations include an AF (autofocus) process, an AE (automatic exposure) process, an AWB (automatic white balance) process, and an EF (electronic flash pre-emission) process. When the release switch shifts to a so-called fully-pressed state, the second switch (SW2) shifts to the ON state. When the second switch (SW2) has shifted to the ON state, the main control unit 101 receives a signal (instruction) for allowing imaging to be performed.

The display unit 105 displays a viewfinder image when imaging is performed, the image (image data) resulting from the imaging, characters for an interactive operation, or the like. Note that the display unit 105 need not necessarily be embedded in the electronic device 100. The electronic device 100 can be connected to the display unit 105 inside or outside the electronic device 100, and may appropriately have a display control unit that controls display by the display unit 105.

The memory 106 is a buffer memory that temporarily retains the image data resulting from the imaging by the imaging unit 102. The memory 106 serves as an image display memory for the display unit 105 and serves as a work memory for the main control unit 101.

The memory 107 stores a program to be executed in the main control unit 101 or the like.

The sub-control unit 108 executes the program stored in the memory to be able to control any of the components of the electronic device 100. The sub-control unit 108 is operable with power lower than that consumed by the main control unit 101. The sub-control unit 108 can communicate with the main control unit 101.

The power control unit 109 supplies the power acquired by the connection unit 110 to each of the components of the electronic device 100. At this time, the power control unit 109 charges the battery 111 with the power acquired by the connection unit 110.

The connection unit 110 is an interface that connects the power supply device 300 and the electronic device 100. The connection unit 110 has a CC (Configuration Channel) terminal to be used by devices each compliant with the USB PD standard to perform communication therebetween. The electronic device 100 uses the connection unit 110 to perform data communication with the power supply device 300. The connection unit 110 has a VBUS terminal that performs power communication. The electronic device 100 uses the connection unit 110 to acquire the power from the power supply device 300.

Note that, in the first embodiment, the electronic device 100 is a USB device, and the connection unit 110 includes an interface connector and a USB device controller each for performing USB communication. The main control unit 101 controls the connection unit 110 to perform the USB communication with the power supply device 300.

The battery 111 supplies the power required to cause the electronic device 100 to operate. When the power supply from the power supply device 300 is stopped, the electronic device 100 operates with power supplied from the battery 111. Accordingly, even when the power supply from the power supply device 300 is stopped, the electronic device 100 can safely continue to operate. The battery 111 is detachable from the electronic device 100. The battery 111 can acquire the power acquired by the connection unit 110 via the power control unit 109. Thus, the battery 111 is charged. The battery 111 includes a CPU that performs a battery authentication process, a RAM, and a ROM. The battery 111 performs the battery authentication process with the main control unit 101 or with the sub-control unit 108. The battery authentication process is an authentication process for determining whether or not the battery 111 is a predetermined battery.

The power source control unit 112 controls, based on a state of the electronic device 100, the power supplied from the battery 111 or the power control unit 109 to another of the components of the electronic device 100.

Figure 3:
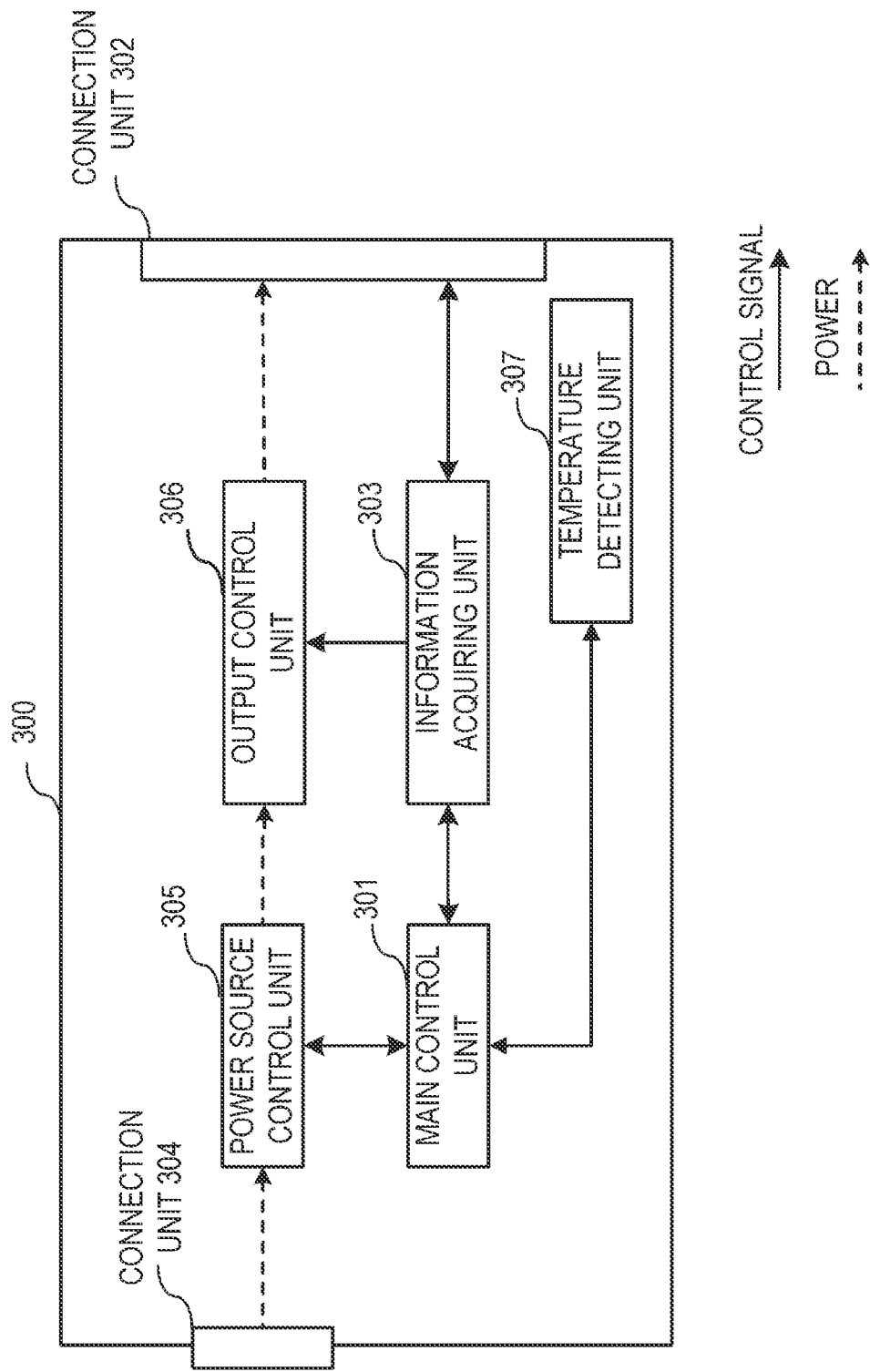
FIG. 3 is a block diagram for illustrating components of a power supply device 300 in the first embodiment.

Next, referring to FIG. 3, components of the power supply device 300 will be described. The power supply device 300 includes a main control unit 301, a connection unit 302, an information acquiring unit 303, a connection unit 304, a power source control unit 305, an output control unit 306, and a temperature detecting unit 307.

The main control unit 301 executes the program stored in the memory to control each of the components of the power supply device 300.

The connection unit 302 is an interface to be connected to the electronic device 100 via the cable 200. The connection unit 302 supplies the power to the electronic device 100. The connection unit 302 has a CC terminal and a VBUS terminal.

The information acquiring unit 303 controls PD (Power Delivery) communication of the power supply device 300. For example, as the control of the PD communication, the information acquiring unit 303 reports a power supply capability of the power supply device 300. The information acquiring unit 303 can negotiate power required by the electronic device 100 (set the required power to an optimum value) through communication using a CC (Configuration Channel) terminal. In addition, the information acquiring unit 303 can further acquire cable information (such as a current capacity, performance, and vendor information) from the cable 200 (E-marked cable) connected thereto through the communication using the CC terminal. The information acquiring unit 303 can require, from the cable 200, authentication information (certificate) for authenticating the cable 200 as the E-marked cable.

The connection unit 304 acquires electric power from a household wall socket or from a battery.

The power source control unit 305 converts the power acquired by the connection unit 304 to power that can be supplied to the electronic device 100 and outputs the power. For example, when power (9 V, 3 A) is supplied from a domestic power source (a 100 V and 50 Hz ac power source) to the electronic device 100, the power source control unit 305 converts an ac voltage to a dc voltage to convert the dc voltage to 9 V. Note that the power source control unit 305 follows an instruction from the main control unit 301 to control the power based on the power supply capability of the power supply device 300. Accordingly, information on a voltage and a current that can be output after the conversion by the power source control unit 305 corresponds to information on the power that can be supplied from the power supply device 300.

The output control unit 306 is connected to the VBUS terminal of the connection unit 302. The output control unit 306 controls the power supplied from the power source control unit 305 to the electronic device 100. The output control unit 306 follows an instruction from the main control unit 301 or the electronic device 100 to perform a power supply stopping process or the like.

The temperature detecting unit 307 detects a temperature in the connection unit 302 to notify the main control unit 301 of the detected temperature. To the connection unit 302, heat is conducted from the cable 200 via a metal connector. Accordingly, by detecting the temperature in the connection unit 302, the temperature detecting unit 307 can detect a temperature of the cable 200 (temperature equivalent to the temperature of the cable 200).

Figure 4:
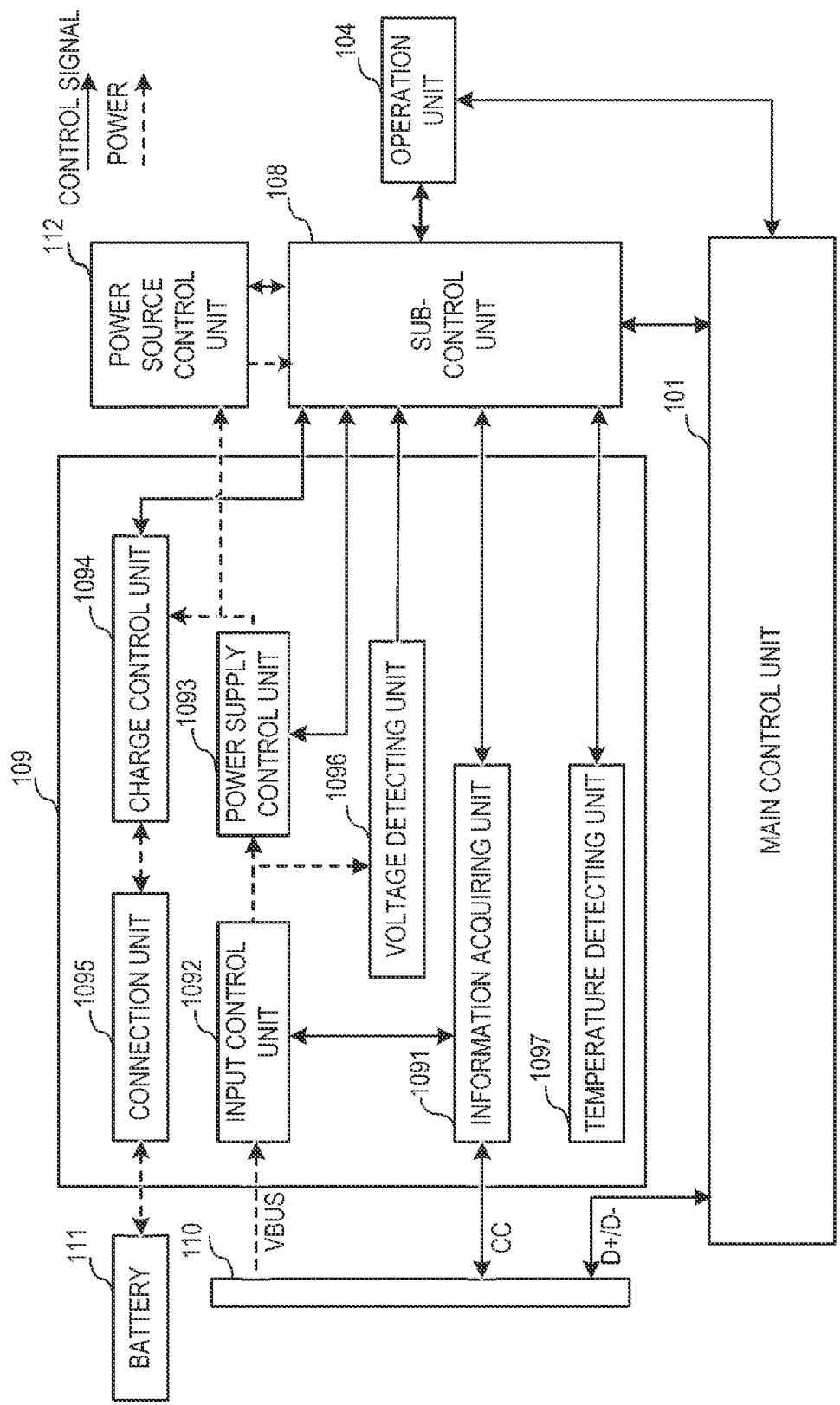
FIG. 4 is a block diagram for illustrating components of a power control unit 109 in the first embodiment.

Next, referring to FIG. 4, components of the power control unit 109 will be described. The power control unit 109 includes an information acquiring unit 1091, an input control unit 1092, a power supply control unit 1093, a charge control unit 1094, a connection unit 1095, a voltage detecting unit 1096, and a temperature detecting unit 1097.

The information acquiring unit 1091 is connected to a CC terminal of the connection unit 110. The information acquiring unit 1091 can detect the power supply capability of the power supply device 300 connected thereto at a CC terminal voltage. The information acquiring unit 1091 can negotiate the power to be supplied thereto with the power supply device 300 through communication using the CC terminal. In addition, through the communication using the CC terminal, the information acquiring unit 1091 can further acquire the cable information of the cable 200 and require, from the cable 200, the authentication information (certificate) for authenticating the cable 200 as the E-marked cable.

The input control unit 1092 is connected to the VBUS terminal of the connection unit 110. The input control unit 1092 acquires the power (VBUS power) from the power supply device 300 connected to the VBUS terminal. The input control unit 1092 follows an instruction from the sub-control unit 108 based on the information acquired by the information acquiring unit 1091 to switch the power supply control unit 1093 between the power supply state and the power supply stopping state.

The power supply control unit 1093 converts a voltage of the power (VBUS power) supplied thereto via the input control unit 1092 to a voltage usable by each of the power source control unit 112 and the charge control unit 1094. For example, the power supply control unit 1093 reduces a 5 V voltage supplied thereto to an appropriate battery voltage. In the first embodiment, the battery 111 is a 1-cell battery, and therefore constant current charging (CC charging) and constant voltage charging (CV charging) is performed such that a fully-charged state is achieved at 4.2 V. When the battery 111 is not connected to the electronic device 100, the power supply control unit 1093 converts the VBUS power to a most efficient voltage (e.g., 3.7 V) in the power source control unit 112.

The power supply control unit 1093 can limit, based on the power supply capability of the power supply device 300, a current to be supplied to each of the components of the power supply device 300. For example, when the power supply capability of the power supply device 300 corresponds to a 9 V voltage and a 3 A current, the power supply control unit 1093 reduces the voltage to be close to 4.2 V, which serves as the battery voltage of the battery 111, while preventing a current of at least 3 A from flowing into the power source control unit 112 or into the charge control unit 1094.

The charge control unit 1094 charges the battery 111 with the power received from the VBUS terminal via each of the input control unit 1092 and the power supply control unit 1093. The charge control unit 1094 performs the CC charging and the CV charging of the battery 111, while controlling the current so as not to damage the battery 111.

To the connection unit 1095, the battery 111 detachable from the electronic device 100 can be connected. Power to be supplied to the battery 111 via the connection unit 1095 is supplied to a battery cell, an authentication circuit, and a thermistor each included in the battery 111.

The voltage detecting unit 1096 detects a voltage of the VBUS power input thereto and notifies the sub-control unit 108 of a value of the voltage. When the power supply capability of the power supply device 300 corresponds to, e.g., a 9 V voltage and a 3 A current, the voltage detecting unit 1096 detects whether or not the power supply device 300 outputs a voltage of at least an expected value (such as 15 V). The voltage detecting unit 1096 also detects whether or not the voltage of the VBUS power input thereto is significantly lower than 9 V due to occurrence of a short circuit resulting from the electronic device 100 in an abnormal state or the like. When such an abnormal voltage is detected, the sub-control unit 108 stops an operation of the input control unit 1092 and gives, to the power supply device 300, an instruction to stop the power supply via the information acquiring unit 1091. While FIG. 4 illustrates the voltage detecting unit 1096 detecting a voltage between the input control unit 1092 and the power supply control unit 1093, the voltage detecting unit 1096 may also detect, e.g., a voltage between the connection unit 110 and the connection unit 1095.

The temperature detecting unit 1097 detects (monitors) the temperature in the connection unit 110 and notifies the sub-control unit 108 of a value of the detected temperature. To the connection unit 110, heat is conducted from the cable 200 via the metal connector. Accordingly, by detecting the temperature in the connection unit 110, the temperature detecting unit 1097 can detect the temperature of the cable 200 (temperature equivalent to the temperature of the cable 200). When the temperature of the cable 200 is higher than a threshold temperature Th, the sub-control unit 108 controls the input control unit 1092 to stop the power reception by the connection unit 110. Alternatively, when the temperature of the cable 200 is higher than the threshold temperature Th, the sub-control unit 108 gives, to the power supply device 300, an instruction to stop the power supply via the information acquiring unit 1091.

Figure 5:
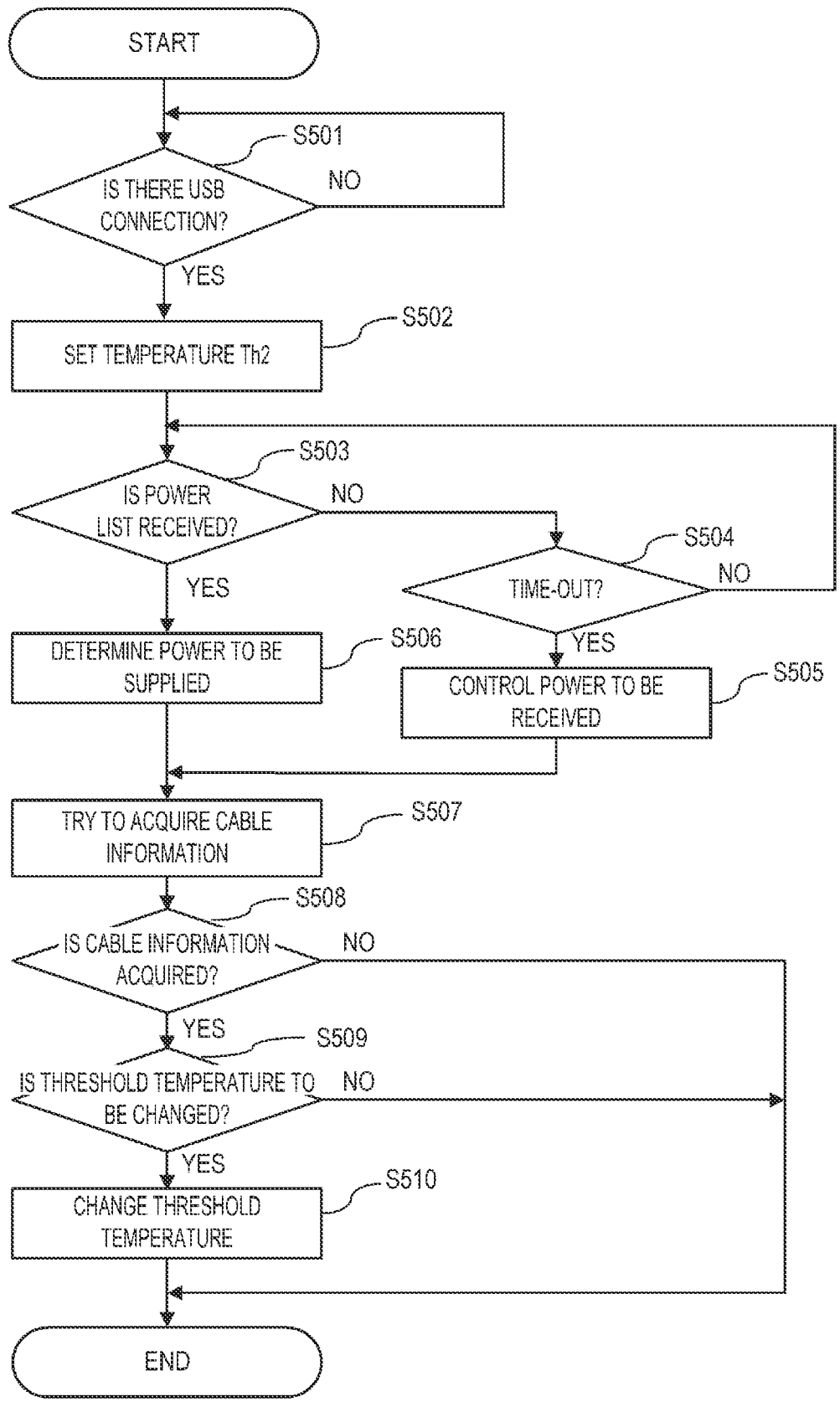
FIG. 5 is a flow chart for illustrating a threshold temperature setting process in the first embodiment.

Next, referring to a flow chart in FIG. 5, a threshold temperature setting process to be performed in the electronic device 100 in the first embodiment will be described. Note that the threshold temperature setting process illustrated in the flow chart in FIG. 5 is controlled through execution of the program by the sub-control unit 108 of the electronic device 100. Before the flow chart in FIG. 5 is started, the sub-control unit 108 sets a temperature Th1 as the threshold temperature Th. The temperature Th1 mentioned herein is an upper-limit temperature that can be permitted by the electronic device 100 (upper-limit value of the permissible temperature). The temperature Th1 is a predetermined temperature. The information indicating the temperature Th1 is preliminarily stored in the sub-control unit 108 or a memory accessible by the sub-control unit 108. Both the threshold temperature Th and a temperature Th3 which will be described later, are stored in the sub-control unit 108 or in a memory accessible by the sub-control unit 108.

In Step S501, the sub-control unit 108 determines whether or not the power supply device 300 is USB-connected to the connection unit 110. For example, the sub-control unit 108 may also determine that the power supply device 300 is USB-connected to the connection unit 110 when the voltage detecting unit 1096 detects the VBUS voltage. Alternatively, the sub-control unit 108 may also determine, based on a voltage level at the CC terminal of the information acquiring unit 1091, that the power supply device 300 is USB-connected to the connection unit 110. The process of Step S501 is repeated until the power supply device 300 is USB-connected to the connection unit 110. When the power supply device 300 is USB-connected to the connection unit 110, the threshold temperature setting process proceeds to Step S502.

In Step S502, the sub-control unit 108 sets a temperature Th2 as the threshold temperature Th. The temperature Th2 mentioned herein is a temperature at which the cable 200 is not damaged and which corresponds to an upper-limit value of a permissible temperature of a main material used for an insulator or a sheath material of a typical cable. For example, respective upper-limit values of the permissible temperatures of ethylene polypylene or polyurethane, polypropylene, polyethylene, and vinyl are 90° C., 80° C., 75° C., and 60° C. In the first embodiment, 60° C. as a temperature that can be permitted by a cable formed of any of the materials is used as the temperature Th2. Accordingly, as long as the threshold temperature Th is the temperature Th2, the sub-control unit 108 can prevent the power supply device 300 from supplying the power before a temperature at which the cable is damaged is reached. The temperature Th2 is a predetermined temperature. The information indicating the temperature Th2 is preliminarily stored in the sub-control unit 108 or a memory accessible by the sub-control unit 108.

In Step S503, the information acquiring unit 1091 determines whether or not a power list including combinations of voltage values and current values that can be supplied from the power supply device 300 is received from the information acquiring unit 303. When the power list is received from the information acquiring unit 303, the threshold temperature setting process proceeds to Step S506. When the power list is not received from the information acquiring unit 303, the threshold temperature setting process proceeds to Step S504.

In Step S504, the information acquiring unit 1091 determines whether or not a time-out is called before the reception of the power list by the information acquiring unit 1091. For example, when the power list is not transmitted even after a lapse of 620 ms, the electronic device 100 transmits a reset signal to the information acquiring unit 303 via the information acquiring unit 1091. When the electronic device 100 and the power supply device 300 are normally connected by the appropriate cable 200, the power list is transmitted from the information acquiring unit 303 that has acquired the reset signal. Then, when the power list cannot be received even though the information acquiring unit 1091 repeats the transmission of the reset signal after a 620 ms waiting period three times, a time-out is called. When a time-out is called before the reception of the power list by the information acquiring unit 1091, the threshold temperature setting process proceeds to Step S505. When a time-out is not called before the reception of the power list by the information acquiring unit 1091, the threshold temperature setting process proceeds to Step S503.

In Step S505, the sub-control unit 108 controls the power supply control unit 1093 so that power that is within the power supply capability of the power supply device 300 determined based on the CC terminal voltage is received from the power supply device 300.

In Step S506, the information acquiring unit 1091 performs the PD communication with the power supply device 300 to determine the power to be supplied from the power supply device 300.

In Step S507, the information acquiring unit 1091 issues a request for VCONN_Swap to try to acquire the cable information of the cable 200. The request for VCONN_Swap is a request for exchange between a function of Source and a function of Sink, which is a request for a right to supply power to the cable 200. When the request for VCONN_Swap is issued and VCONN_Swap is permitted, the electronic device that has become Sink can serve as VCONN_Source. When allowed by VCONN_Swap to serve as VCONN_Source, the electronic device that has become Sink can acquire the cable information of the cable 200 from the cable 200. The cable information includes, e.g., a maximum operating temperature. The maximum operating temperature is an item included in USB Power Delivery Revision 3.0 Active Cable VDO2.

In Step S508, the sub-control unit 108 determines whether or not the information acquiring unit 1091 has successfully acquired the cable information of the cable 200 from the cable 200. When the information acquiring unit 1091 has successfully acquired the cable information of the cable 200, the sub-control unit 108 determines that the cable 200 is a safe E-marked cable. When the information acquiring unit 1091 has successfully acquired the cable information of the cable 200, the threshold temperature setting process proceeds to Step S509. When the information acquiring unit 1091 has not successfully acquired the cable information of the cable 200, the flow chart in FIG. 5 is ended, and therefore the sub-control unit 108 does not change the threshold temperature Th from the temperature Th2. Note that, when the information acquiring unit 1091 has not successfully acquired the cable information of the cable 200, the sub-control unit 108 determines that the cable 200 is not a E-marked cable.

In Step S509, the sub-control unit 108 determines whether or not to change the threshold temperature Th from the temperature Th2 to the temperature Th3. When the temperature Th3 indicated by the cable information is higher than the temperature Th2, the sub-control unit 108 determines that the threshold temperature Th is to be changed to the temperature Th3 from temperature Th2. The temperature Th3 serves herein as, e.g., the maximum operating temperature indicated by the cable information. When the threshold temperature Th is to be changed from the temperature Th2 to the temperature Th3, the threshold temperature setting process proceeds to Step S510. When the threshold temperature Th is not to be changed from the temperature Th2, the flow chart in FIG. 5 is ended.

In Step S510, the sub-control unit 108 changes the threshold temperature Th from the temperature Th2 to the temperature Th3. This allows the sub-control unit 108 to set, e.g., the higher one of the temperature Th2 and the temperature Th3 as the threshold temperature Th. If the higher one of the temperature Th2 and the temperature Th3 is served as the threshold temperature Th, the temperature of the cable 200 is not limited more than necessary, and it is possible to reduce the possibility that the power supply (or power reception) is stopped. Therefore, it is possible to achieve both the safety of the cable 200, the electronic device 100, and the power supply device 300 and the stability of the power supply.

Note that, to ensure the maximum safety of the electronic device 100 and the cable 200, it may also be possible that the sub-control unit 108 sets the lower one of the temperature Th2 and the temperature Th3 as the threshold temperature Th in step S510. When considering the possibility that the cable 200 is a cable pretending to be the E-marked cable, the sub-control unit 108 may set the lower one of the temperature Th2 and the temperature Th3 as the threshold temperature Th in step S510.

Furthermore, when the temperature Th3 is higher than the temperature Th1 in step S510, the sub-control unit 108 may also change the threshold temperature Th from the temperature Th2 to the temperature Th1 irrespective of a magnitude relationship between the temperature Th2 and the temperature Th3. This can prevent the cable 200 from being heated to a temperature higher than the temperature Th1 as the permissible temperature of the electronic device 100.

Thus, when detecting a temperature exceeding the threshold temperature Th, the sub-control unit 108 stops the power reception by the connection unit 110 (or stops the operation of the input control unit 1092). Alternatively/Additionally, when detecting a temperature exceeding the threshold temperature Th, the sub-control unit 108 further gives, to the power supply device 300, an instruction to stop the power supply via the information acquiring unit 1091. This can prevent the temperature of the cable 200 from changing to a temperature of at least the permissible temperature and thus improves the safety of the cable 200, the power supply device 300, and the electronic device 100.

Note that the processes performed by the sub-control unit 108 when detecting a temperature exceeding the threshold temperature Th is not limited to the stopping of the power reception by the electronic device 100 and/or the stopping of the power supply from the power supply device 300. When detecting a temperature exceeding the threshold temperature Th, the sub-control unit 108 may appropriately perform control so as to reduce the power acquired by the electronic device 100 to a level lower than that when the sub-control unit 108 does not detect a temperature exceeding the threshold temperature Th. This can also suppress a temperature rise in the cable 200 and thus improves the safety of the cable 200 and the electronic device 100.

Second Embodiment

The following will describe a second embodiment. The respective components of the electronic device 100 and the power supply device 300 in the second embodiment are the same as the respective components of the electronic device 100 and the power supply device 300 in the first embodiment, and therefore detailed descriptions thereof are omitted. Since the threshold temperature Th, temperature Th1, temperature Th2, and temperature Th3 in the second embodiment are the same as the threshold temperature Th, temperature Th1, temperature Th2, and temperature Th3 in the first embodiment, therefore detailed descriptions thereof are omitted.

Figure 6:
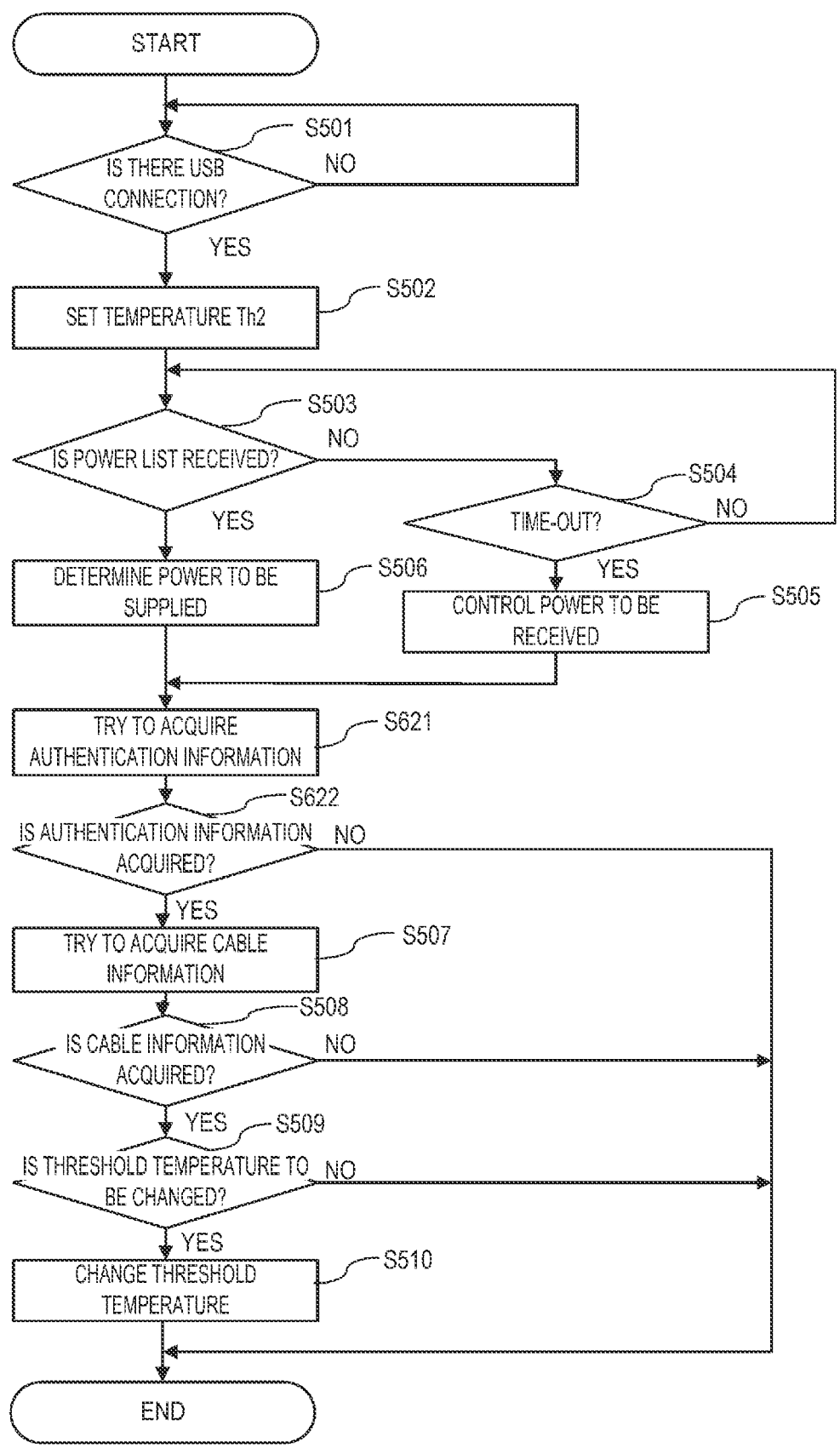
FIG. 6 is a flow chart for illustrating a threshold temperature setting process in a second embodiment.

Referring to a flow chart in FIG. 6, the threshold temperature setting process to be performed in the electronic device 100 in the second embodiment will be described. Note that the threshold temperature setting process illustrated in the flow chart in FIG. 6 is controlled through execution of the program by the sub-control unit 108. The processes of Steps S501 to S510 are the same as the processes of Steps S501 to S510 in the first embodiment, and therefore detailed descriptions thereof are omitted. Before the flow chart in FIG. 6 is started, in the same manner as in the first embodiment, the sub-control unit 108 sets the temperature Th1 as the threshold temperature Th.

In Step S621, the information acquiring unit 1091 issues a request for VCONN_Swap to try to acquire the authentication information of the cable 200. When the request for VCONN_Swap is accepted, the information acquiring unit 1091 can acquire the authentication information of the cable 200 from the cable 200. For the acquisition of the authentication information, an authentication method based on USB Type-C Authentication Specification Revision 1.0 can be used.

In Step S622, the sub-control unit 108 determines whether or not the information acquiring unit 1091 has successfully acquired the authentication information of the cable 200 from the cable 200. When the information acquiring unit 1091 has successfully acquired the authentication information of the cable 200, the threshold temperature setting process proceeds to Step S507. When the information acquiring unit 1091 has not successfully acquired the authentication information of the cable 200, the flow chart in FIG. 6 is ended. Consequently, when the authentication information of the cable 200 is not acquired, the sub-control unit 108 does not change the threshold temperature Th from the temperature Th2 irrespective of the cable information of the cable 200. Note that, when the information acquiring unit 1091 has not successfully acquired the cable information of the cable 200 from the cable 200, the sub-control unit 108 determines that the cable 200 is either a cable pretending to be the E-marked cable or a cable which is not a E-marked cable.

Note that, in the second embodiment, when the information acquiring unit 1091 acquires the authentication information of the cable 200 in Step S622, the electronic device 100 tries to acquire the cable information of the cable 200 in Step S507. However, the electronic device 100 may also try to acquire the cable information of the cable 200 in a step previous to Step S622. In this case, when the authentication information of the cable 200 is not acquired in Step S622, the sub-control unit 108 does not refer to the cable information of the cable 200, and does not change the threshold temperature Th from the temperature Th2.

Thus, when the temperature detecting unit 1097 detects a temperature exceeding the threshold temperature Th, the sub-control unit 108 stops the operation of the input control unit 1092 and gives an output stop (or power supply stop) instruction to the power supply device 300 via the information acquiring unit 1091. This can prevent the temperature of the cable from reaching a level of at least the permissible temperature and thus improves safety of the cable and the electronic device.

In the second embodiment, when the authentication information cannot be acquired from the cable 200 (when the cable 200 cannot be authenticated as the E-marked cable), the electronic device 100 does not change the threshold temperature Th from the temperature Th2. As a result, even when the cable 200 is not the E-marked cable, it is possible to prevent the electronic device 100 from changing the threshold temperature Th to an erroneous temperature. This further improves the safety of the cable 200, the power supply device 300, and the electronic device 100.

Third Embodiment

The first or second embodiment has described the example in which, when the temperature of the cable 200 exceeds the threshold temperature Th, the electronic device 100 performs control so as to stop the power supply from the power supply device 300 or the like. A third embodiment will describe an example in which, when the temperature of the cable 200 exceeds the threshold temperature Th, the power supply device 300 stops the power supply or the like to the electronic device 100. The respective components of the electronic device 100 and the power supply device 300 in the third embodiment are the same as the components of the respective configurations of the electronic device 100 and the power supply device 300 in the first embodiment, and therefore detailed descriptions thereof are omitted.

In the third embodiment, when the temperature detecting unit 307 detects a temperature exceeding the threshold temperature Th, the main control unit 301 gives, to the output control unit 306, an instruction to stop the power supply. Alternatively, when the temperature detecting unit 307 detects a temperature exceeding the threshold temperature Th, the main control unit 301 gives, to the electronic device 100, an instruction to stop the power reception via the information acquiring unit 303.

Figure 7:
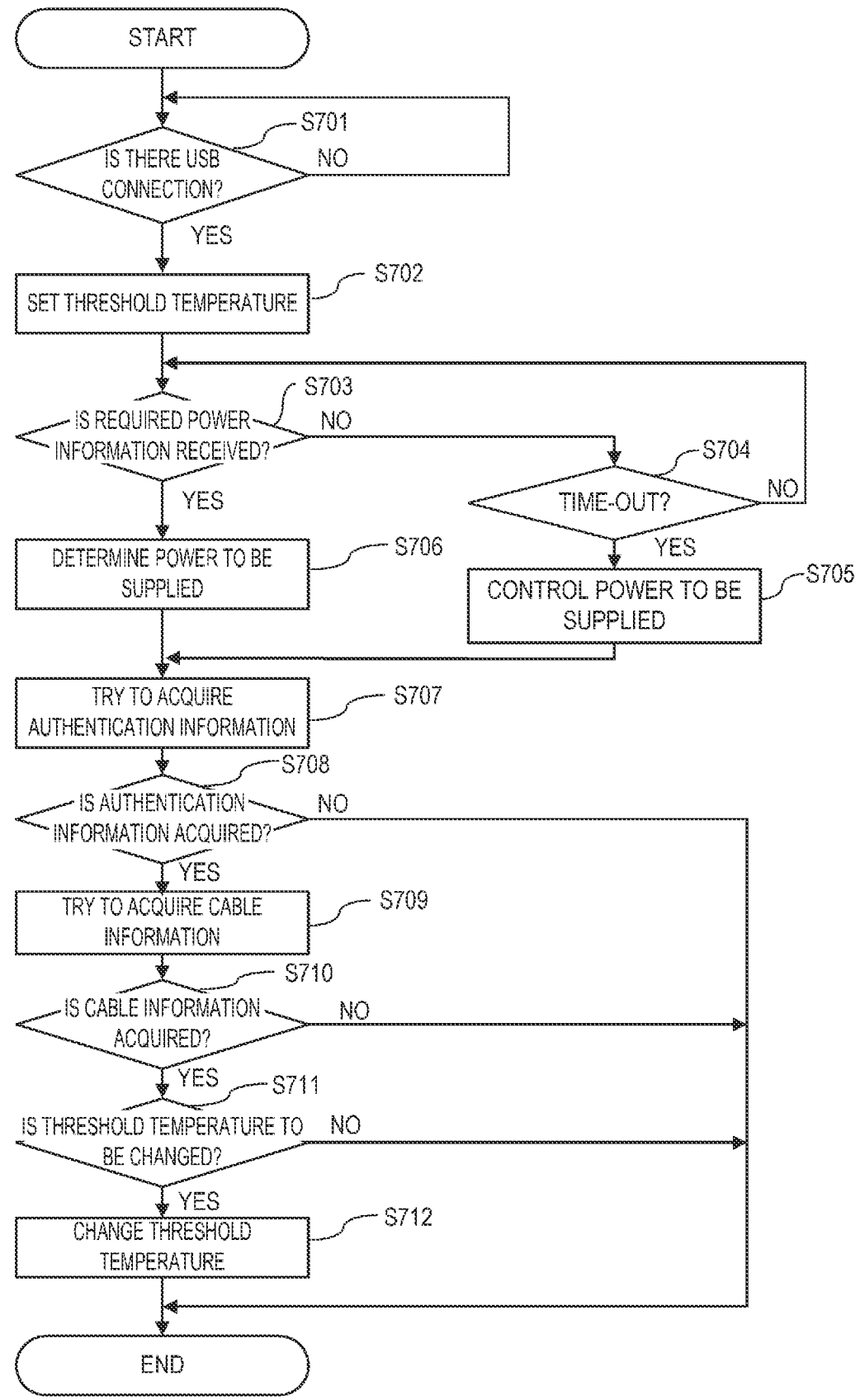
FIG. 7 is a flow chart for illustrating a threshold temperature setting process in a third embodiment.

Referring to the flow chart in FIG. 7, the threshold temperature setting process to be performed in the power supply device 300 in the third embodiment will be described below. Note that the threshold temperature setting process illustrated in the flow chart in FIG. 7 is controlled through execution of the program by the main control unit 301. Before the flow chart in FIG. 7 is started, the main control unit 301 sets the temperature Th1 as the threshold temperature Th. The temperature Th1 is the upper-limit temperature that can be permitted by the power supply device 300 (upper-limit value of the permissible temperature). The temperature Th1 is a predetermined temperature. The information indicating the temperature Th1 is preliminarily stored in the main control unit 301 or a memory accessible by the main control unit 301. Both the threshold temperature Th and the temperature Th3 are stored in the main control unit 301 or in a memory accessible by the main control unit 301.

In Step S701, the main control unit 301 determines whether or not the electronic device 100 is USB-connected to the connection unit 302. For example, the power supply device 300 determines, based on a voltage level at the CC terminal of the information acquiring unit 303, whether or not the electronic device 100 is USB-connected to the connection unit 302. The process of Step S701 is repeated until the electronic device 100 is USB-connected to the connection unit 302. When the electronic device 100 is USB-connected to the connection unit 302, the threshold temperature setting process flow proceeds to Step S702.

In Step S702, in the same manner as in Step S502, the main control unit 301 sets the temperature Th2 as the threshold temperature Th. The temperature Th2 is the temperature at which the cable 200 is not damaged and which corresponds to an upper-limit value of a permissible temperature of a main material used for an insulator or a sheath material of a typical cable. The temperature Th2 is a predetermined temperature. The information indicating the temperature Th2 is preliminarily stored in the main control unit 301 or a memory accessible by the main control unit 301.

In Step S703, the information acquiring unit 303 determines whether or not information (required power information) indicating required power is received from the information acquiring unit 1091. When the required power information is received from the information acquiring unit 1091, the threshold temperature setting process proceeds to Step S706. Otherwise, the threshold temperature setting process proceeds to Step S704.

In Step S704, the information acquiring unit 303 determines whether or not a time-out is called before reception of the required power information. When the required power information has not been transmitted from the information acquiring unit 1091 before a lapse of a predetermined period, a time-out is called. When a time-out is called before the reception of the required power information by the information acquiring unit 303, the threshold temperature setting process proceeds to S705. Otherwise, the threshold temperature setting process proceeds to Step S703.

In Step S705, the main control unit 301 controls the output control unit 306 so that power that is within the power supply capability presented to the electronic device 100 based on the CC terminal voltage is supplied to the electronic device 100.

In Step S706, the information acquiring unit 303 performs the PD communication with the information acquiring unit 1091 and determines the power to be supplied to the electronic device 100.

In Step S707, the information acquiring unit 303 tries to acquire the authentication information of the cable 200. For example, the information acquiring unit 303 tries to acquire the authentication information by using an authentication method based on USB Type-C Authentication Specification Revision 1.0.

In Step S708, the main control unit 301 determines whether or not the information acquiring unit 303 has successfully acquired the authentication information of the cable 200 from the cable 200. When the information acquiring unit 303 has successfully acquired the authentication information of the cable 200, the threshold temperature setting process proceeds to Step S709. When the information acquiring unit 303 has not successfully acquired the authentication information of the cable 200, the flow chart of FIG. 7 is ended. Therefore, when the information acquiring unit 303 has not successfully acquired the authentication information of the cable 200, the main control unit 301 does not change the threshold temperature Th from the temperature Th2. Note that, when the information acquiring unit 303 has not successfully acquired the cable information of the cable 200 from the cable 200, the main control unit 301 determines that the cable 200 is either a cable pretending to be the E-marked cable or a cable which is not a E-marked cable.

In Step S709, the information acquiring unit 303 tries to acquire the cable information of the cable 200.

In Step S710, the main control unit 301 determines whether or not the information acquiring unit 303 has successfully acquired the cable information of the cable 200 from the cable 200. When the information acquiring unit 303 has successfully acquired the cable information of the cable 200, the main control unit 301 determines that the cable 200 is a safe E-marked cable. When the information acquiring unit 303 has successfully acquired the cable information of the cable 200, the threshold temperature setting process proceeds to Step S711. When the information acquiring unit 303 has not successfully acquired the cable information of the cable 200, the flow chart in FIG. 7 is ended. Therefore, when the information acquiring unit 303 has not successfully acquired the cable information of the cable 200, the main control unit 301 does not change the threshold temperature Th from the temperature Th2. Note that, when the information acquiring unit 303 has not successfully acquired the cable information of the cable 200, the main control unit 301 determines that the cable 200 is not a E-marked cable.

In Step S711, the main control unit 301 determines whether or not to change the threshold temperature Th from the temperature Th2 to the temperature Th3. For example, when the temperature Th3 indicated by the cable information is higher than the temperature Th2, the main control unit 301 determines that the threshold temperature Th is to be changed from the temperature Th2 to the temperature Th3. When the threshold temperature Th is to be changed from the temperature Th2 to the temperature Th3, the threshold temperature setting process proceeds to Step S712. When the threshold temperature Th is not to be changed, the flow chart in FIG. 7 is ended.

In Step S712, in the same manner as in Step S510, the main control unit 301 changes the threshold temperature Th from the temperature Th2 to the temperature Th3. For example, when the temperature Th3 is higher than the temperature Th2, the main control unit 301 can change the threshold temperature Th from the temperature Th2 to the temperature Th3. Note that, when the temperature Th3 is higher than the temperature Th1 in step S712, the main control unit 301 may change the threshold temperature Th from the temperature Th2 to the temperature Th1 irrespective of a magnitude relationship between the temperature Th2 and the temperature Th3.

Thus, when the temperature detecting unit 307 detects a temperature exceeding the threshold temperature Th, the main control unit 301 gives, to the output control unit 306, an instruction to stop the power supply. Alternatively, the main control unit 301 gives, to the electronic device 100, an instruction to stop the power reception via the information acquiring unit 303. This can prevent the temperature of the cable 200 from changing to a level of at least the permissible temperature, and thus improves safety of the cable 200, the electronic device 100, and the power supply device 300.

Fourth Embodiment

Various functions, processes, and methods that have been described in the above embodiments can also be implemented by a personal computer, a microcomputer, a CPU (Central Processing Unit), or the like by using a program. In a fourth embodiment, the personal computer, the microcomputer, the CPU, or the like is hereinafter referred to as a "computer X". In the fourth embodiment, a program for controlling the computer X and for implementing the various functions, processes, and methods described in the above embodiments is referred to as a "program Y".

The various functions, processes and methods described in the above embodiments are implemented through execution of the program Y by the computer X. In this case, the program Y is supplied to the computer X via a computer readable storage medium. The computer readable storage medium in the fourth embodiment includes at least one of a hard disk device, a magnetic storage device, an optical storage device, a magnetooptical storage device, a memory card, a volatile memory, a nonvolatile memory, or the like. The computer readable storage medium in the fourth embodiment is a non-transitory (non-transient) storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2020-134685, filed on Aug. 7, 2020, which is hereby incorporated by reference herein in its entirety.

What is claimed is:

1. An electronic device comprising:
a CPU; and
a memory storing a program which, when executed by the CPU, causes the electronic device to perform:
a first detection of detecting that a cable is connected to the electronic device;
a second detection of detecting a temperature of the cable connected to the electronic device;
a communication of receiving cable information including information related to the cable from the cable connected to the electronic device;
a first setting to set a threshold temperature to a second threshold temperature being preset and representing an upper limit value of a permissible temperature of a typical cable to be connected to the electronic device, in a case where the first detection has detected that the cable is connected to the electronic device;

a second setting to set the threshold temperature to a third threshold temperature representing a temperature value indicated by the cable information, in a case where the communication has received the cable information from the cable and the third threshold temperature is higher than the second threshold temperature; and controlling a power supply device to stop supplying power from the power supply device to the electronic device via the cable or controlling the electronic device to stop receiving power from the power supply device via the cable, in a case where a temperature of the cable detected by the second detection is higher than the set threshold temperature.

2. The electronic device according to claim 1, wherein the first setting sets the threshold temperature to the second threshold temperature in a case where the communication has not successfully received the cable information.

3. The electronic device according to claim 1, wherein the program, when executed by the CPU, further causes the electronic device to perform a third setting to set the threshold temperature to a first threshold temperature being preset and representing an upper limit value of a permissible temperature of the electronic device, in a case where the third threshold temperature indicated by the cable information is higher than the first threshold temperature and the communication has received the cable information from the cable.

4. The electronic device according to claim 1, wherein the second setting sets the threshold temperature to the third threshold temperature, in a case where the third threshold temperature indicated by the cable information is higher than the second threshold temperature and the communication has received authentication information to authenticate that the cable is compliant with Universal Serial Bus power delivery standard from the cable and has received the cable information from the cable.

5. The electronic device according to claim 1, wherein the first setting sets the second threshold temperature as the threshold temperature, in a case where the third threshold temperature indicated by the cable information is not higher than the second threshold temperature and the communication has received authentication information to authenticate that the cable is compliant with Universal Serial Bus power delivery standard from the cable and has received the cable information from the cable.

6. The electronic device according to claim 1, wherein the first setting sets the second threshold temperature as the threshold temperature in a case where the communication has received authentication information to authenticate that the cable is compliant with Universal Serial Bus power delivery standard from the cable and has not successfully received the cable information from the cable.

7. The electronic device according to claim 1, wherein the program, when executed by the CPU, further causes the electronic device to perform a third setting to set the threshold temperature to a first threshold temperature being preset and representing an upper limit value of a permissible temperature of the electronic device, in a case where the third threshold temperature indicated by the cable information is higher than the first threshold temperature and the communication has received authentication information to authenticate that the cable is compliant with Universal Serial Bus power delivery standard from the cable and has received the cable information from the cable.

8. The electronic device according to claim 1, wherein the third threshold temperature indicated by the cable information corresponds to a maximum operating temperature of the cable.

9. An electronic device comprising:

a CPU; and a memory storing a program which, when executed by the CPU, causes the electronic device to perform:

a first detection of detecting that a cable is connected to the electronic device;

a second detection of detecting a temperature of the cable connected to the electronic device;

a communication of receiving cable information including information related to the cable from the cable connected to the electronic device;

a first setting to set a threshold temperature to a second threshold temperature being preset and representing an upper limit value of a permissible temperature of a typical cable to be connected to the electronic device, in a case where the first detection has detected that the cable is connected to the electronic device;

a second setting to set the threshold temperature to a third threshold temperature representing a temperature value indicated by the cable information, in a case where the communication has received the cable information from the cable and the third threshold temperature is higher than the second threshold temperature; and controlling the electronic device to stop supplying power from the electronic device to a power receiving device via the cable or controlling the power receiving device to stop receiving power from the electronic device via the cable, in a case where a detected temperature of the cable detected by the second detection is higher than the set threshold temperature.

10. The electronic device according to claim 9, wherein the second setting sets the threshold temperature to the third threshold temperature, in a case where the third threshold temperature indicated by the cable information is higher than the second threshold temperature and the communication has received authentication information to authenticate that the cable is compliant with Universal Serial Bus power delivery standard from the cable and has received the cable information from the cable.

11. The electronic device according to claim 9, wherein the first setting sets the second threshold temperature as the threshold temperature, in a case where the third threshold temperature indicated by the cable information is not higher than the second threshold temperature and the communication has received authentication information to authenticate that the cable is compliant with Universal Serial Bus power delivery standard from the cable and has received the cable information from the cable.

12. The electronic device according to claim 9, wherein the first setting sets the second threshold temperature as the threshold temperature in a case where the communication has received authentication information to authenticate that the cable is compliant with Universal Serial Bus power delivery standard from the cable and has not successfully received the cable information from the cable.

13. The electronic device according to claim 9, wherein the program, when executed by the CPU, further causes the electronic device to perform a third setting to set the threshold temperature to a first threshold temperature being preset and representing an upper limit value of a permissible temperature of the electronic device, in a case where the third threshold temperature indicated by the cable information is higher than the first threshold temperature and the communication has received authentication information to authenticate that the cable is compliant with Universal Serial Bus power delivery standard from the cable and has received the cable information from the cable.

14. The electronic device according to claim 9, wherein the third threshold temperature indicated by the cable information corresponds to a maximum operating temperature of the cable.

15. A method comprising:
a first detecting step detecting that a cable is connected to an electronic device;
a second detecting step detecting a temperature of the cable connected to the electronic device;
setting a threshold temperature to a second threshold temperature being preset and representing an upper limit value of a permissible temperature of a typical cable to be connected to the electronic device, in a case where the first detecting step has detected that the cable is connected to the electronic device,
setting the threshold temperature to a third threshold temperature representing a temperature value indicated by cable information including information related to the cable, in a case where a communicating unit of the electronic device has received the cable information from the cable and the third threshold temperature is higher than the second threshold temperature, and
controlling a power supply device to stop supplying power from the power supply device to the electronic device via the cable or controlling the electronic device to stop receiving power from the power supply device via the cable, in a case where a temperature of the cable detected in the second detecting step is higher than the set threshold temperature.

16. A method comprising:
a first detecting step detecting that a cable is connected to an electronic device;
a second detecting step detecting a temperature of the cable connected to the electronic device;
setting a threshold temperature to a second threshold temperature being preset and representing an upper limit value of a permissible temperature of a typical cable to be connected to the electronic device, in a case where the first detecting step has detected that the cable is connected to the electronic device;
setting the threshold temperature to a third threshold temperature representing a temperature value indicated by cable information including information related to the cable, in a case where a communicating unit of the electronic device has received the cable information from the cable and the third threshold temperature is higher than the second threshold temperature, and
controlling the electronic device to stop supplying power from the electronic device to a power receiving device via the cable or controlling the power receiving device to stop receiving power from the electronic device via the cable, in a case where a temperature of the cable detected in the second detecting step is higher than the threshold temperature.

17. A non-transitory storage medium that stores a program causing a computer to execute a method, the method comprising:
a first detecting step detecting that a cable is connected to an electronic device;
a second detecting step detecting a temperature of the cable connected to the electronic device;

changing a threshold temperature to a second threshold temperature being preset and representing an upper limit value of a permissible temperature of a typical cable to be connected to the electronic device, in a case where the first detecting step has detected that the cable is connected to the electronic device,
setting the threshold temperature to a third threshold temperature representing a temperature including information related to the cable in a case where the temperature indicated by the cable information is higher than the second threshold temperature and in a case where a communicating unit of the electronic device has received the cable information from the cable,
determining whether or not a temperature of the cable detected in the second detecting step is higher than the set threshold temperature, and
controlling a power supply device to stop supplying power from the power supply device to the electronic device via the cable or controlling the electronic device to stop receiving power from the power supply device via the cable in a case where the temperature of the cable detected in the second detecting step is higher than the set threshold temperature.

18. A non-transitory storage medium that stores a program causing a computer to execute a method, the method comprising:
a first detecting step detecting that a cable is connected to an electronic device;
a second detecting step detecting a temperature of the cable connected to the electronic device;
setting a threshold temperature to a second threshold temperature being preset and representing an upper limit value of a permissible temperature of a typical cable to be connected to the electronic device, in a case where the first detecting step has detected that the cable is connected to the electronic device;
setting the threshold temperature to a third threshold temperature representing a temperature value indicated by cable information including information related to the cable in a case where a communicating unit has received the cable information from the cable and the third threshold temperature is higher than the second threshold temperature,
determining whether or not a temperature of the cable detected in the second detecting step is higher than the threshold temperature, and
controlling the electronic device to stop supplying power from the electronic device to a power receiving device via the cable or controlling the power receiving device to stop receiving power from the electronic device via the cable in a case where the temperature of the cable detected in the second detecting step is higher than the threshold temperature.

19. The electronic device according to claim 1, the program, when executed by the CPU, further causes the electronic device to perform:
a power receiving to receive power from the power supply device via the cable connected to the electronic device in accordance with Universal Serial Bus (USB) power delivery standard,
wherein the cable is compliant with USB Type-C standard and is one of an E-marked cable, a cable pretending to be the E-marked cable and a cable other than the E-marked cable.

20. The electronic device according to claim 9, the program, when executed by the CPU, further causes the electronic device to perform:
- a power supplying to supply power to the power receiving device via the cable connected to the electronic device in accordance with Universal Serial Bus (USB) power delivery standard,
- wherein the cable is compliant with USB Type-C standard and is one of an E-marked cable, a cable pretending to be the E-marked cable and a cable other than the E-marked cable.

* * * * *